(12) United States Patent
Kagohara et al.

(10) Patent No.: US 6,471,796 B1
(45) Date of Patent: Oct. 29, 2002

(54) METHOD AND APPARATUS FOR CONTINUOUS CASTING OF ALUMINUM BEARING ALLOY

(75) Inventors: Yukihiko Kagohara; Masahito Fujita; Koichi Yamamoto; Takayuki Shibayama, all of Aichi (JP)

(73) Assignee: Daido Metal Company Ltd. (JP)

( * ) Notice: Subject to any disclaimer, the term of this patent is extended or adjusted under 35 U.S.C. 154(b) by 0 days.

(21) Appl. No.: 09/670,376

(22) Filed: Sep. 27, 2000

(30) Foreign Application Priority Data

Sep. 11, 2000 (GB) .............................................. 0022199

(51) Int. Cl.$^7$ .............................................. B22D 11/06
(52) U.S. Cl. ........................ 148/551; 164/486; 164/481
(58) Field of Search ................................ 164/485, 486, 164/481, 431, 432, 443, 444; 148/549, 550, 551, 552

(56) References Cited

U.S. PATENT DOCUMENTS

| | | |
|---|---|---|
| 4,000,008 A | 12/1976 | Chia |
| 4,235,280 A | 11/1980 | Helms et al. |
| 4,424,855 A | 1/1984 | Tsubakihara et al. |
| 4,501,314 A | 2/1985 | Wakabayashi et al. |
| 4,901,785 A | 2/1990 | Dykes et al. |
| 5,671,801 A | 9/1997 | Lauener |
| 5,725,046 A | 3/1998 | Sartschev et al. |
| 5,846,350 A | * 12/1998 | Bergsma ..................... 148/549 |
| 6,267,829 B1 | * 7/2001 | Backerud et al. ........... 148/415 |

FOREIGN PATENT DOCUMENTS

| | | |
|---|---|---|
| DE | 198 33 200 A1 | 1/2000 |
| EP | 0 145 811 | 6/1985 |
| EP | 0 583 867 | 2/1994 |

(List continued on next page.)

OTHER PUBLICATIONS

"Patent Abstracts of Japan" European Patent Office, for JP60261649, published Dec. 24, 1985, applicant Sumitomo Metal Ind Ltd, title "Casting Method of Steel in Twin Belt Caster".

"Patent Abstracts of Japan" European Patent Office, for JP61253150, published Nov. 11, 1986, applicant, Sumitomo Metal Ind Ltd, title "Continuous Casting Method by Twin Belt Caster".

"Patent Abstracts of Japan" European Patent Office, for JP59004949, published Jan. 11, 1984, applicant, Hitachi Zosen Corp, title "Drawing Device of Continuous Casting Ingot Using Belt Type Mold".

"Patent Abstracts of Japan" European Patent Office, for JP63183758, published Jul. 29, 1988, applicant, The Furukawa Electric Co Ltd, title "Continuous Casting Method".

"Patent Abstracts of Japan" European Patent Office, for JP58179546, published Oct. 20, 1983, applicant Ishikawajima Harima Heavy Ind Co Ltd, title "Continuous Casting Device of Hoop".

*Primary Examiner*—George Wyszomierski
*Assistant Examiner*—Janelle Combs Morillo
(74) *Attorney, Agent, or Firm*—Browdy and Neimark, P.L.L.C.

(57) ABSTRACT

In a continuous casting of a molten aluminum bearing alloy, a casting space is defined between substantially parallel opposed portions of a pair of traveling endless belts and the molten aluminum bearing alloy is supplied into the casting space to be continuously cast into the shape of a plate. A cooling rate $\Delta T$ during solidification of the aluminum bearing alloy is controlled so that the cooling rate $\Delta T$ ranges between 3 and 6° C./sec. where $\Delta T=(T-500)/t$, T is a temperature when the casting of the aluminum bearing alloy starts, and t is a cooling time in sec. between start of casting and the time when the temperature of the aluminum bearing alloy decreases to 500° C.

7 Claims, 6 Drawing Sheets

FOREIGN PATENT DOCUMENTS

| | | |
|---|---|---|
| EP | 0 650 790 | 5/1995 |
| FR | 2 504 036 | 10/1982 |
| GB | 569337 | 5/1945 |
| GB | 623486 | 5/1949 |
| GB | 2 008 005 | 5/1979 |
| GB | 2 010 736 | 7/1979 |
| JP | 56-68564 | 6/1981 |
| JP | A58-64332 | 4/1983 |
| JP | A-58-67841 | 4/1983 |
| JP | 60-131956 | 7/1985 |
| JP | 61-229447 | 10/1986 |
| JP | 3-39439 | 2/1991 |
| JP | 6-81064 | 3/1994 |
| WO | 91/00933 A1 | 1/1991 |

\* cited by examiner

Al-Si-Fe INTERMETALLIC COMPOUND CAST STRUCTURE

| | Alloy No. | Alloy composition (mass %) | | | | | | | | | | | | Casting machine | Cooling rate (°C/sec) |
|---|---|---|---|---|---|---|---|---|---|---|---|---|---|---|---|
| | | Sn | Si | Fe | Mn | V | Mo | Cr | Ti | Cu | Mg | Zn | | | |
| Invention product | 1 | 20 | 4.0 | 0.4 | | | | | | 1.0 | | | BC1 | 3.5 |
| | 2 | 13 | 3.0 | 0.2 | 0.3 | | | | | 0.8 | | | BC1 | 4.5 |
| | 3 | 10 | 3.0 | 0.3 | | | | | | 0.7 | | | BC1 | 5.5 |
| | 4 | 10 | 4.0 | 1.0 | | 0.2 | 0.3 | | 0.15 | 1.4 | | | BC1 | 5.0 |
| | 5 | 4 | 4.0 | 0.3 | 0.3 | | | 0.3 | 0.1 | 1.2 | | | BC1 | 4.5 |
| | 6 | 4 | 6.0 | 0.1 | | | | 0.2 | 0.2 | 0.8 | 0.2 | 3.0 | BC1 | 4.0 |
| Prior art product | 11 | 20 | 4.0 | 0.4 | | | | | | 1.0 | | | BC2 | 2.0 |
| | 12 | 13 | 3.0 | 0.2 | 0.3 | | | | | 0.8 | | | BC2 | 1.8 |
| | 13 | 10 | 3.0 | 0.3 | | 0.2 | 0.3 | | 0.15 | 0.7 | | | BC2 | 1.5 |
| | 14 | 10 | 4.0 | 1.0 | | | | 0.3 | 0.1 | 1.4 | | | BC2 | 1.7 |
| | 15 | 4 | 4.0 | 0.3 | 0.3 | | | 0.2 | 0.2 | 1.2 | | | BC2 | 1.7 |
| | 16 | 4 | 6.0 | 0.1 | | | | | | 0.8 | 0.2 | 3.0 | BC2 | 1.6 |

FIG. 5

|  | Alloy No. | Structure | Rolling Workability | Maximum Specific load with no fatigue (MPa) | Wear amount (μm) | Maximum Specific load with no seizure (MPa) |
|---|---|---|---|---|---|---|
| Invention product | 1 | ○ | ○ | 125 | 12 | 80 |
|  | 2 | ○ | ○ | 120 | 5 | 80 |
|  | 3 | ○ | ○ | 125 | 5 | 75 |
|  | 4 | ○ | ○ | 130 | 7 | 75 |
|  | 5 | ○ | ○ | 120 | 9 | 85 |
|  | 6 | ○ | ○ | 135 | 7 | 85 |
| Prior art product | 11 | × | × | 110 | 13 | 75 |
|  | 12 | × | × | 110 | 8 | 75 |
|  | 13 | × | × | 105 | 6 | 70 |
|  | 14 | × | × | 110 | 8 | 70 |
|  | 15 | × | × | 100 | 12 | 80 |
|  | 16 | × | × | 100 | 11 | 80 |

FIG. 6

METHOD AND APPARATUS FOR CONTINUOUS CASTING OF ALUMINUM BEARING ALLOY

BACKGROUND OF THE INVENTION

1. Field of the Invention

This invention relates generally to a method and apparatus for continuously casting molten aluminum into a plate-shaped bearing alloy by belt casting means, and more particularly to such a casting method and apparatus in which crystals can be prevented from being coarsened.

2. Description of the Prior Art

As an apparatus for continuously casting a metal which melts at a relatively low temperature, for example, aluminum, aluminum alloys, zinc, etc., a belt casting machine has been known in which casting is carried out between a pair of endless belts. In the known belt casting machine, each belt is passed over or around a plurality of rollers. A horizontal or slightly inclined casting space is defined between substantially horizontal portions of the belts. The belts are driven by driving rollers so as to travel while being cooled by a cooling system. A molten metal is supplied into the casting space to be cooled by the belts, thereby solidifying into the shape of a plate. Plate-shaped materials are continuously fed out of the casting space. The aforesaid belt casting machine of the movable casting mold type is superior in a casting speed and accordingly in the productivity to a continuous casting machine of the fixed casting mold type.

A bearing lined with an aluminum bearing alloy, which is referred to as "aluminum alloy bearing," is generally used for engines of automobiles or industrial machines. The aluminum alloy bearing is manufactured sequentially through steps of casting, rolling, cladding, heat treatment and machining. More specifically, molten metals are cast into the shape of a plate. The cast plate is rolled in the rolling step. The cast plate is then cladded on a steel sheet so that a bimetal is made. The bimetal is annealed so that the bonding strength between the cast plate and the steel sheet is improved. Thereafter, the bimetal is machined to be finally formed into a semi-cylindrical or cylindrical bearing.

Manufacturers of engine bearings have used the aforesaid belt casting machine for continuously casting the aluminum alloy into the cast plate to thereby improve the productivity. In the belt casting machine, however, a cooling rate for the cast plate is low since the casting speed is high. Thus, the belt casting machine assumes that a slow cooling state is obtained. As a result, coarsening and segregation of crystals such as crystallized Sn and Si are easy to occur in the aluminum alloy containing Sn, Si, etc. Further, in an aluminum alloy containing various elements for improvement of the bearing characteristic, too, crystals of the intermetallic compound are easy to be coarsened and to be segregated. The plasticity of the alloy is reduced when the crystals are segregated or coarsened in the aluminum alloy. As a result, cracks occur in the alloy in the subsequent rolling and cladding steps where plastic deformation processing is executed. Further, decrease in the fatigue strength and wear resistance of the alloy as the bearing characteristics reduces the effect of addition of various elements for the improvement of the bearing characteristics.

SUMMARY OF THE INVENTION

Therefore, it is an object of the present invention is to provide a method and apparatus for continuous casting of aluminum bearing alloy in which coarsening and segregation of the crystals can be prevented when the aluminum bearing alloy is continuously cast into the shape of a plate.

According to a first feature of the invention, it is provided a method of continuous casting of a molten aluminum bearing alloy in which a casting space is defined between substantially parallel opposed portions of a pair of travelling endless belts and the molten aluminum bearing alloy is supplied into the casting space to be continuously cast into the shape of a plate. The method comprises the step of controlling a cooling rate $\Delta T$ during solidification of the aluminum bearing alloy so that the cooling rate $\Delta T$ ranges between 3 and 6° C./sec. where $\Delta T=(T-500)/t$, T is a temperature when the casting of the aluminum bearing alloy starts, and t is a cooling time in sec. between start of casting and the time when the temperature of the aluminum bearing alloy decreases to 500° C.

According to the above-described method, the cooling rate of 3 to 6° C./sec. is higher than one of the conventional belt casting machine, that is, 1 to 2° C./sec. When the aluminum alloy is solidified at such a high cooling rate, the crystal is not coarsened nor segregated. Further, occurrence of cracks can be prevented in the subsequent rolling and cladding. Additionally, the bearing characteristics can be prevented from being reduced.

In a second feature, the aluminum bearing alloy comprises, by mass, 3 to 40% Sn, 0.5 to 7% Si, 0.05 to 2% Fe, and the balance of Al and unavoidable impurities, and a ternary intermetallic compound of Al—SI—Fe is crystallized. In a third feature, the aluminum bearing alloy comprises, by mass, 3 to 40% Sn, 0.5 to 7% Si and 0.05 to 2% Fe and at least one or more of 0.01 to 3% each of Mn, V, Mo, Cr, Co, Ni and W, and the balance of Al and unavoidable impurities and a multi-element intermetallic compound of Al—SI—Fe containing said at least one or more of Mn, V, Mo, Cr, Co, Ni and W is crystallized.

In a fourth feature, the aluminum bearing alloy comprises at least one or more of 0.01 to 2% each of B, Ti and Zr. In a fifth feature, the aluminum bearing alloy comprises at least one or more of 0.1 to 5% each of Cu, Mg and Zn.

The technical background of the development of the aforesaid novel aluminum alloy will now be described. With recent development of high performance engines, engine bearings necessitate further improvement in the fatigue strength and wear resistance. Regarding the fatigue strength, elements such as Cu, Mn and V are added to the aluminum alloy to strengthen the latter. For the purpose of improvement in the wear resistance, JP-A-58-64332 discloses that Si is added to the aluminum alloy and the size and distribution of Si particles crystallized in the aluminum alloy are controlled. Further, JP-A-58-67841 discloses that Mn, Fe, Mo, Ni, etc. are added to the aluminum alloy so that an intermetallic compound between Mn etc. and Al is crystallized in the aluminum alloy. These two cases propose an improvement in the conformability and anti-seizure property of the aluminum alloy, thereby improving the wear resistance.

The above-noted JP-A-58-64332 and JP-A-58-67841 disclose that a desired effect can be achieved when the sizes of Si particles and the intermetallic compound range between 5 $\mu$m and 40 $\mu$m, respectively. Generally, hard particles contained in Al are uniformly distributed to be used for strengthening the aluminum alloy, and the effect is larger as the size of particles becomes small. In the aforesaid two cases, however, when the size of Si and the intermetallic compound is controlled so as to range between 5 $\mu$m and 40 $\mu$m, the strength of the Al matrix and accordingly the fatigue strength of the Al alloy are reduced as the size of Si and the intermetallic compound is relatively large. Thus, the anti-seizure property cannot be improved when crystallized particles are rendered small for improvement in the fatigue strength. On the other hand, the fatigue strength cannot be improved when the crystallized particles are rendered large for improvement in the anti-seizure property and accordingly in the wear resistance.

The inventors developed an Al alloy by crystallizing a ternary intermetallic compound of Al—SI—Fe or a multi-element intermetallic compound containing Al—SI—Fe as the base. The Al alloy can improve the anti-seizure property and wear resistance without reduction in the fatigue strength. The ternary intermetallic compound of Al—SI—Fe and the multi-element intermetallic compound containing Al—SI—Fe as the base are exceedingly stable, and its basic shape is not changed even by the heat treatment after cladding with a back metal. More specifically, Si crystallizes as a eutectic in the form like a three-dimensionally connected coral. The crystallized Si is crushed to pieces by rolling after casting or rolling in the cladding with the back metal. Further, Si also changes its form by a subsequent heat treatment. This is a characteristic of Si and particularly in the heat treatment in which the temperature exceeds 300° C., Si changes into a relatively rounded so that a surface tension thereof is reduced. This tendency is enhanced in a material containing a large amount of Sn, for example, an Al—Sn bearing alloy.

However, the aforesaid ternary intermetallic compound or multi-element intermetallic compound does not change its crystallized form (an example is shown in FIG. 3) and does not change its form at a temperature for a usual heat treatment. Further, the ternary or multi-element intermetallic compound is crushed in the rolling step with plastic deformation or the cladding step during manufacture of the bearing. However, as the result of crush, the intermetallic compound takes a form with a sharp edge such as a broken piece of an edged tool. FIG. 4 shows an example of such a form. Although Si particles are rounded and broken into pieces through the steps of rolling and heat treatment, the aforesaid ternary or multi-element intermetallic compound retains an aggressive form with a sharp edge.

The ternary or multi-element intermetallic compound has a lapping effect on a shaft even when its amount is small. Particularly, the ternary or multi-element intermetallic compound stabilizes the relationship between a shaft with an unstable initial operation and the bearing. Thus, the ternary or multi-element intermetallic compound is effective in improving the conformability. More concretely, the ternary or multi-element intermetallic compound scrapes off protrusions on the surface of the shaft and an edge such as burrs around nodular graphite on the surface of the shaft. The ternary or multi-element intermetallic compound further prevents the Al alloy from wear due to adhesion to the shaft, which is a disadvantage of the Al alloy. Additionally, the ternary or multi-element intermetallic compound further scrapes away an adherent matter to thereby prevent seizure due to the adherent matter. Moreover, the ternary or multi-element intermetallic compound is relatively large even after the rolling step. Minutely pulverized Si particles are distributed in the Al matrix, thereby improving the strength of the Al matrix. Consequently, both improvement in the wear resistance and anti-seizure property and improvement in the fatigue strength can be achieved.

The Al alloy is solidified with a cooling rate ranging between 3 and 6° C./sec in accordance with the casting method of the present invention when the Al alloy crystallizing the ternary or multi-element intermetallic compound is cast. Consequently, the intermetallic compound can be controlled so that a crystalline size ranges between 40 and 55 $\mu$m without coarsening the intermetallic compound. Further, a crystallized Si can also be controlled so as to be at or below 40 $\mu$m. Thereafter, when the casting plate is rolled or when the back metal is cladded on the cast plate, the intermetallic compound is pulverized into a size ranging between 1 and 20 $\mu$m and the crystallized Si is at or below 5 $\mu$m.

The reasons for the amount limitation of each aforesaid component will be described below.

(1) Sn (3 to 40 Mass %)

Sn improves surface properties such as anti-seizure property, conformability and embeddability as a bearing. When the Sn content is less than 3%, the above-mentioned effects are small. When it exceeds 40%, mechanical properties of the bearing alloy are deteriorated with the result of reduction in the bearing performance. A preferable Sn content ranges between 6 and 20%.

(2) Si (0.5 to 7 Mass %)

Si dissolves in the aluminum matrix and partially crystallizes as a single substance of silicon particle to disperse finely, so as to enhance the fatigue strength of the material and serve to improve the anti-seizure property and wear resistance. On the other hand, Si is an essential element in order to form the Al—SI—Fe intermetallic compound and improves the lapping, anti-seizure property, and wear resistance. When the Si content is less than 0.5%, Si dissolves into the Al matrix such that the above effects are small. When it exceeds 7%, its crystal is coarsened, so as to reduce the fatigue strength of the bearing alloy. A preferable Si content ranges between 2 and 6%.

(3) Fe (0.05 to 2 Mass %)

Fe crystallizes mainly as the Al—SI—Fe intermetallic compound, so as to produce the above-described effects. The intermetallic compound containing Fe prevents seizure with a shaft and improves the wear resistance. The characteristic is effective when the Fe content ranges between 0.05 and 2%. When the Fe content is less than 0.05%, the above-mentioned effects are small. When the Fe content exceeds 2%, the compound is coarsened and the bearing alloy becomes brittle, whereupon the rolling work causes trouble. A preferable Fe content ranges between 0.07 and 1%.

(4) Mn, V, Mo, Cr, Co, Ni, and W (at Least One Element of These: 0.01 to 3 Mass % in a Total Amount)

These are optional elements which constitute the multi-element intermetallic compound in the present invention. More specifically, when a selected element a is added to Al—SI—Fe, a multi-element intermetallic compound of Al—SI—Fe-α is produced. The selected element dissolves in the aluminum matrix as a single substance to thereby strengthen the matrix. Effects of the multi-element intermetallic compound cannot be expected when the content of each element is less than 0.01%. When the content of each element exceeds 3%, the multi-element intermetallic compound is excessively coarsened such that the physical properties of the bearing alloy are degraded and plastic workability of the bearing alloy such as rolling is degraded. A preferable content ranges between 0.2 and 2%.

(5) B, Ti and Zr (at Least One of These Elements: 0.01 to 2 Mass % in a Total Amount)

These optional elements do not contribute to formation of the Al—SI—Fe intermetallic compound, dissolving in the aluminum matrix, so as to improve the fatigue strength of the bearing alloy. The aforesaid effect is small when the content is less than 0.01%. When the content exceeds 2%, the bearing alloy becomes brittle. A preferable content ranges between 0.02 and 0.5%.

(6) Cu, Mg, and Zn (at Least One of These: 0.1 to 5 Mass % in a Total Amount)

These optional elements are additional elements which improve the strength of the aluminum matrix. A solution treatment forces these elements to dissolve in the aluminum matrix. When these elements are cooled and aged, fine compounds can be precipitated. The effects cannot be expected when the additive amount is less than 0.1%. When the additive amount exceeds 5%, the compound becomes coarse. A preferable additive amount ranges between 0.5 and 4%.

The present invention also provides an apparatus for continuously casting a molten aluminum bearing alloy into the shape of a plate, comprising belt casting means including a pair of travelling endless belts and a casting space defined between substantially parallel opposed portions of a pair of travelling endless belts and having two ends, molten metal supplying means for supplying molten aluminum bearing alloy into the casting space from one end side of the casting space, cooling means for cooling, through a medium of the endless belts, the molten aluminum bearing alloy supplied into the casting space, and water spraying means for spraying water onto the cast plate from both sides thereof to cool the same, the cast plate being continuously cast in the casting space and fed out of the other end side of the casting space by the travelling of the belts (as a sixth feature).

According to the above-described continuous casting apparatus, water is sprayed onto both sides of the cast plate fed out of the casting space. The cast plate is cooled rapidly to be solidified. Consequently, the crystal can be prevented from being coarsened.

In a seventh feature, the water spraying means sprays water onto a portion of the cast plate immediately after the portion has been fed out of said other end of the casting space.

In an eighth feature, the continuous casting apparatus further comprises a splashproof member provided for preventing splash of the water sprayed from the water spraying means onto the cast plate, the splashproof member being disposed to cover both sides of the cast plate fed out of the casting space. The endless belts come into contact with the molten metal such that its temperature is increased. Accordingly, when the water sprayed by the water spraying means splashes onto the endless belts, there is a possibility that the splashed water may explosively be vaporized. In the above-described construction, the splashproof member prevents the water sprayed by the spraying means from splashing on the endless belts. Consequently, the water can be prevented from being explosively vaporized.

In a ninth feature, the splashproof member has at least an end at the casting space side, the end being inclined so as to gradually come close to the cast plate toward the casting space side. When the splashproof member is thus inclined, the splashed water strikes against the splashproof member to be repelled in such a direction that it leaves away from the casting space. Consequently, the water can more reliably be prevented from splashing onto the endless belts.

In a tenth feature, the continuous casting apparatus further comprises air spraying means forming an air curtain located nearer to the casting space side than the water spraying means is, thereby preventing the water sprayed by the water spraying means from splashing toward each belt side.

BRIEF DESCRIPTION OF THE DRAWINGS

Other objects, features and advantages of the present invention will become clear upon reviewing of the following description of the preferred embodiment, made with reference to the accompanying drawings, in which:

FIG. 5 shows a composition of alloys cast in a test, types of continuous casting machines used in the test and cooling rate; and FIG. 6 shows the results of inspection of the structure and rolling workability of the cast plate regarding the alloys as shown in FIG. 5, and the results of tests for fatigue resistance, wear resistance and anti-seizure property regarding bearings made from the aforesaid alloys.

DETAILED DESCRIPTION OF THE PREFERRED EMBODIMENT

Figure 2:
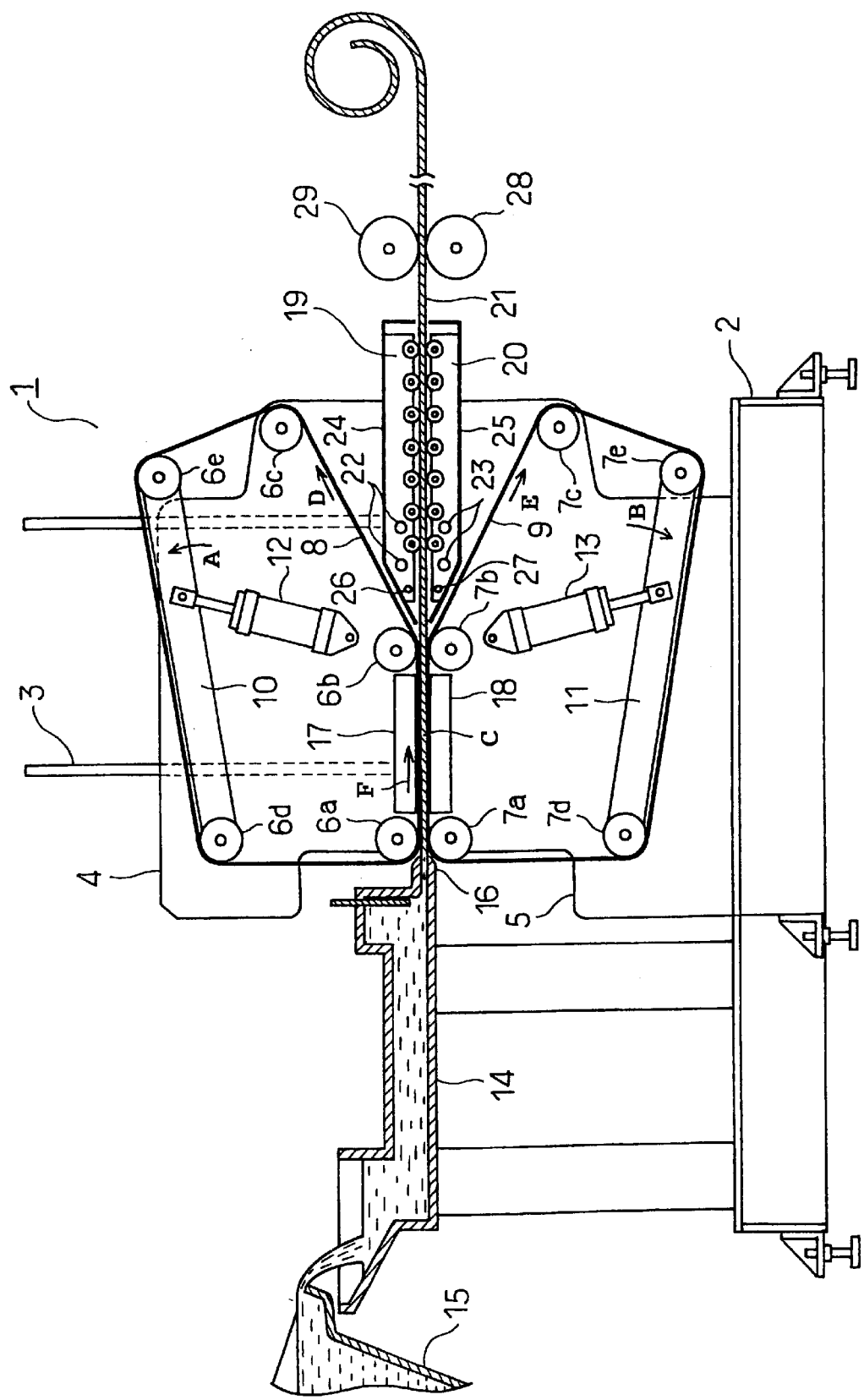
FIG. 2 is a sectional view of a continuous casting machine comprising the belt casting machine.

One embodiment of the present invention will be described with reference to the accompanying drawings. A continuous casting machine casting an aluminum alloy into the shape of a plate mainly comprises a belt casting machine serving as belt casting means. Referring to FIG. 2, the belt casting machine 1 is shown which comprises a base 2 on which a plurality of supports 3 stand. An upper machine frame 4 is supported on the supports 3 so as to be movable upward and downward. A lower machine frame 5 is also fixed to the base 2 so as to be located below the upper machine frame 4. A plurality of rollers 6a to 6e and 7a to 7e are provided on both machine frames 4 and 5 respectively. A pair of endless belts 8 and 9 are passed through the rollers 6a to 6e and 7a to 7e respectively. Each endless belt is made of a steel plate or heat-resistant fiber.

The right-hand upper roller 6e of the upper machine frame 4 is mounted on a distal end of an arm 10 rotatably supported on the upper machine frame 4 as viewed in FIG. 2. The right-hand lower roller 7e of the lower machine frame 5 is mounted on a distal end of an arm 11 rotatably supported on the lower machine frame 5. The arms 10 and 11 are urged by hydraulic cylinders 12 and 13 so as to be rotated in the directions of arrows A and B, thereby applying tension to the endless belts 8 and 9 respectively. The belts 8 and 9 are driven so as to travel in the directions D and E respectively.

A part of the upper endless belt 8 between the rollers 6a and 6b is substantially parallel to a part of the lower endless belt 9 between the rollers 7a and 7b. A space where the belts 8 and 9 are parallel to each other serves as a casting space C. Right-hand and left-hand sides of the casting space C are closed by sealing members (not shown) respectively. A molten metal reservoir 14 serving as molten metal supplying means is provided on the left-hand side of the base 2 so as to be located at one end side of the casting space C. A molten metal for an aluminum alloy is supplied from a molten metal container 15 into the molten metal reservoir 14. The molten metal reservoir 14 includes a nozzle 16 through which the molten metal is supplied into the casting space C.

The belt casting machine 1 includes water-cooling jackets 17 and 18 for cooling the endless belts 8 and 9 respectively. The water-cooling jackets 17 and 18 are mounted on the machine frames 4 and 5 so as to come into contact with parallel portions of the endless belts 8 and 9 at opposite sides respectively. The water-cooling jackets 17 and 18 cool via the endless belts 8 and 9 the molten metal of the aluminum alloy supplied into the casting space C.

Figure 1:
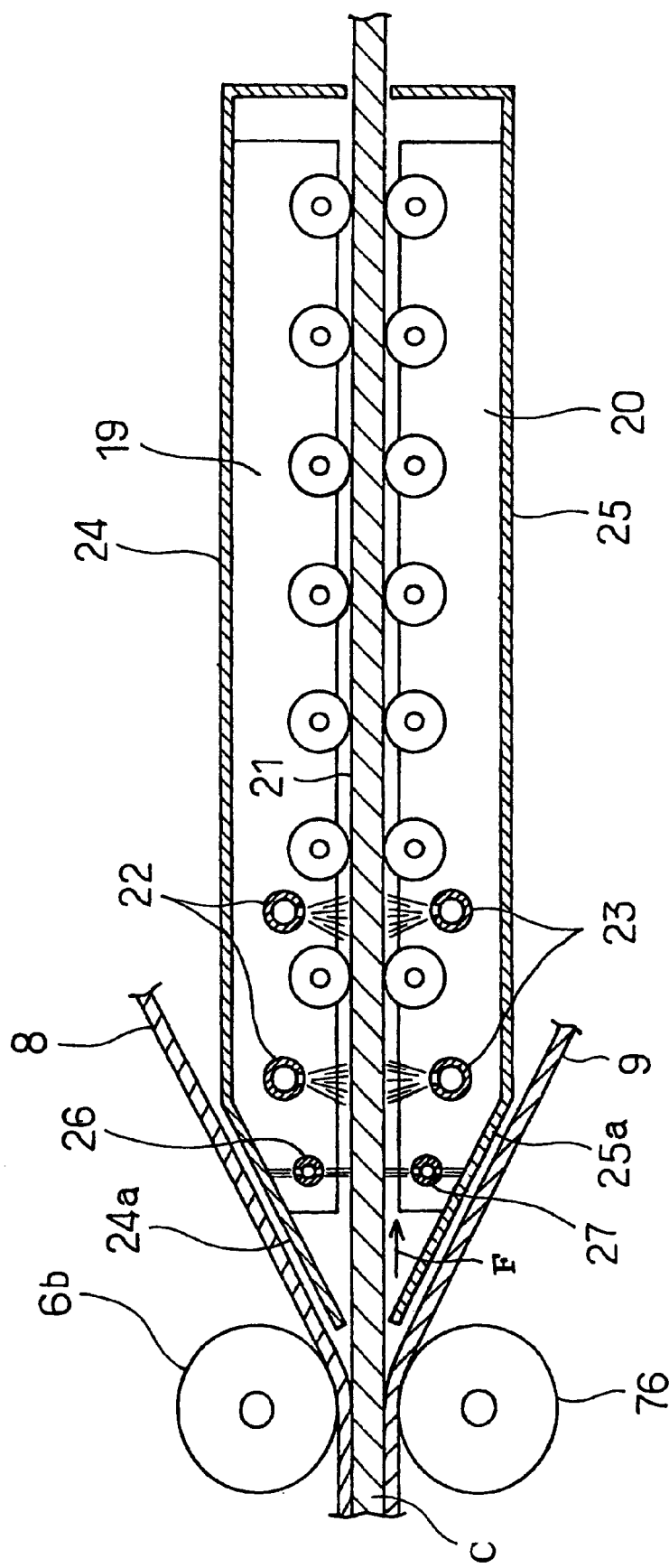
FIG. 1 is a sectional view of the outlet side of a belt casting machine of one embodiment in accordance with the present invention.

Two vertically opposed roller conveyors 19 and 20 are provided on the upper and lower machine frames 4 and 5 so as to be located at the other end side of the casting space C. An aluminum alloy cast into the shape of a plate in the casting space C or cast plate 21 is fed out to a section between the roller conveyors 19 and 20. Two water-spraying pipes 22 and two water-spraying pipes 23 are provided on portions of the roller conveyors 19 and 20 at the casting space C side respectively, as viewed in FIG. 1. The water-spraying pipes 22 and 23 serve as water spraying means for spraying water onto the cast plate 21 at both sides of the material immediately after the cast plate has been fed out of the casting space C. The pipes 22 and 23 are arranged in the direction of arrow F in which the cast plate 21 is fed. Although a thickness of the cast plate 21 is set at 15 mm in the embodiment, the thickness is variable by adjusting the vertical position of the upper machine frame 4 so that a height of the casting space C is adjusted.

Two splashproof members 24 and 25 are provided on the both machine frames 4 and 5 for preventing water sprayed by the water-spraying pipes 22 and 23 from splashing outward respectively. The splashproof members 24 and 25 are formed into the shape of a shallow flat container and disposed to cover the roller conveyors 19 and 20 defining a passage for the cast plate 21. The splashproof members 24 and 25 have ends located at the casting space C side and inclined downward and upward toward the casting space C, so that the distance between the ends is gradually reduced as the ends approach the casting space C.

Two air spraying pipes 26 and 27 are provided on inner portions of the splashproof members 24 and 25 so as to be located nearer to the casting space C than the water-spraying pipes 22 and 23, respectively. The air spraying pipes 26 and 27 serve as air spraying means. The air spraying pipes 26 and 27 spray air upward and downward to form respective air curtains between the cast plate 21 and the respective splashproof members 24 and 25, thereby preventing water sprayed by the respective water-spraying pipes 22 and 23 from advancing to the casting space C side (in the direction opposed to arrow F) to adhere on the endless belts 8 and 9. The cast plate 21 fed out by the roller conveyors 19 and 20 is subsequently held between pinch rollers 28 and 29 to be finally wound into the shape of a coil by a winding machine (not shown).

The operation of the continuous casting apparatus will now be described. When molten metal for the aluminum alloy is supplied from the molten metal container 15 into the molten metal reservoir 14, the molten metal is fed from the nozzle 16 of the reservoir 14 into the casting space C. The molten metal fed into the casting space C is cooled via the endless belts 8 and 9 by the water-cooling jackets 17 and 18. The molten metal gradually solidifies as the result of cooling and is fed in the direction of arrow F by the endless belts 8 and 9 travelling in the directions of arrows D and E respectively while being formed into the shape of a plate. The water-spraying pipes 22 and 23 sprays water onto portions of both sides of the cast plate 21 immediately after these portions have been fed out of the casting space C. The cast plate 21 is thus cooled by the sprayed water immediately when fed out of the casting space C. The cast plate 21 is then cooled by the water sprayed by the water spraying pipes 22 and 23 followed by the cooling by the water-cooling jackets 17 and 18. The cast plate 21 is cooled rapidly by the sprayed water and the solidification is then completed.

The molten metal supplied into the casting space C is at about 800° C. Solidification is regarded to be completed when the cast plate 21 is cooled until a portion of the cast plate 21 excluding Sn is cooled to about 500° C. An amount of water supplied into each water-cooling jacket 17 or 18 and an amount of water sprayed by each water-spraying pipe 22 or 23 are set so that the temperature of the cast plate 21 is reduced from 800° C. as the casting starting temperature to 500° C. at a cooling rate of 3 to 6° C./sec by the water-cooling jackets 17 and 18 and the water-spraying pipes 22 and 23 until the solidification is completed. As the result of the above-described rapid-cooling at such a cooling rate, the crystallized intermetallic compound in the cast plate 21 is prevented from being coarsened and segregated.

As obvious from the foregoing, the cooling speed is defined as the cooling rate $\Delta T$=(casting starting temperature T-500)/(cooling time period elapsing from the start of casting to the time the temperature of cast plate is decreased to 500° C.). The water sprayed from the water-spraying pipes 22 and 23 splashes against the cast plate 21. The molten metal whose temperature is at about 800° C. is supplied into the casting space C. Accordingly, in a case where the endless belts 8 and 9 on which water is adherent comes into contact with the molten metal, the water rapidly vaporizes, which is dangerous. In the foregoing embodiment, however, water spray is carried out between the paired splashproof members 24 and 25. Water splashed on the cast plate 21 is prevented from splashing outward. Consequently, water does not adhere on the endless belts 8 and 9. The upper face of the end of the upper splashproof member 24 at the casting space C side is inclined downward toward the casting space C. The lower face of the end of the lower splashproof member 25 at the casting space C side is inclined upward toward the casting space C. The water splashed toward the casting space C collides against the inclined faces 24a and 25a to be splashed back toward the side opposite the casting space C. Consequently, water can be prevented from splashing outward through spaces defined between the splashproof members 24 and 25 and the cast plate 21.

Moreover, the air spraying pipes 26 and 27 are located nearer to the casting space C than the water-spraying pipes 22 and 23, respectively. The air spraying pipes 26 and 27 form the air curtains between the splashproof members 24 and 25 and the cast plate 21. Consequently, the water sprayed by the pipes 22 and 23 can further be prevented from advancing toward the casting space C side and leaking from the spaces between the splashproof members 24 and 25 and the cast plate 21 to adhere on the endless belts 8 and 9. The water received by the splashproof members 24 and 25 is discharged through a discharge passage (not shown) provided on the lower splashproof member 25.

Figure 3:
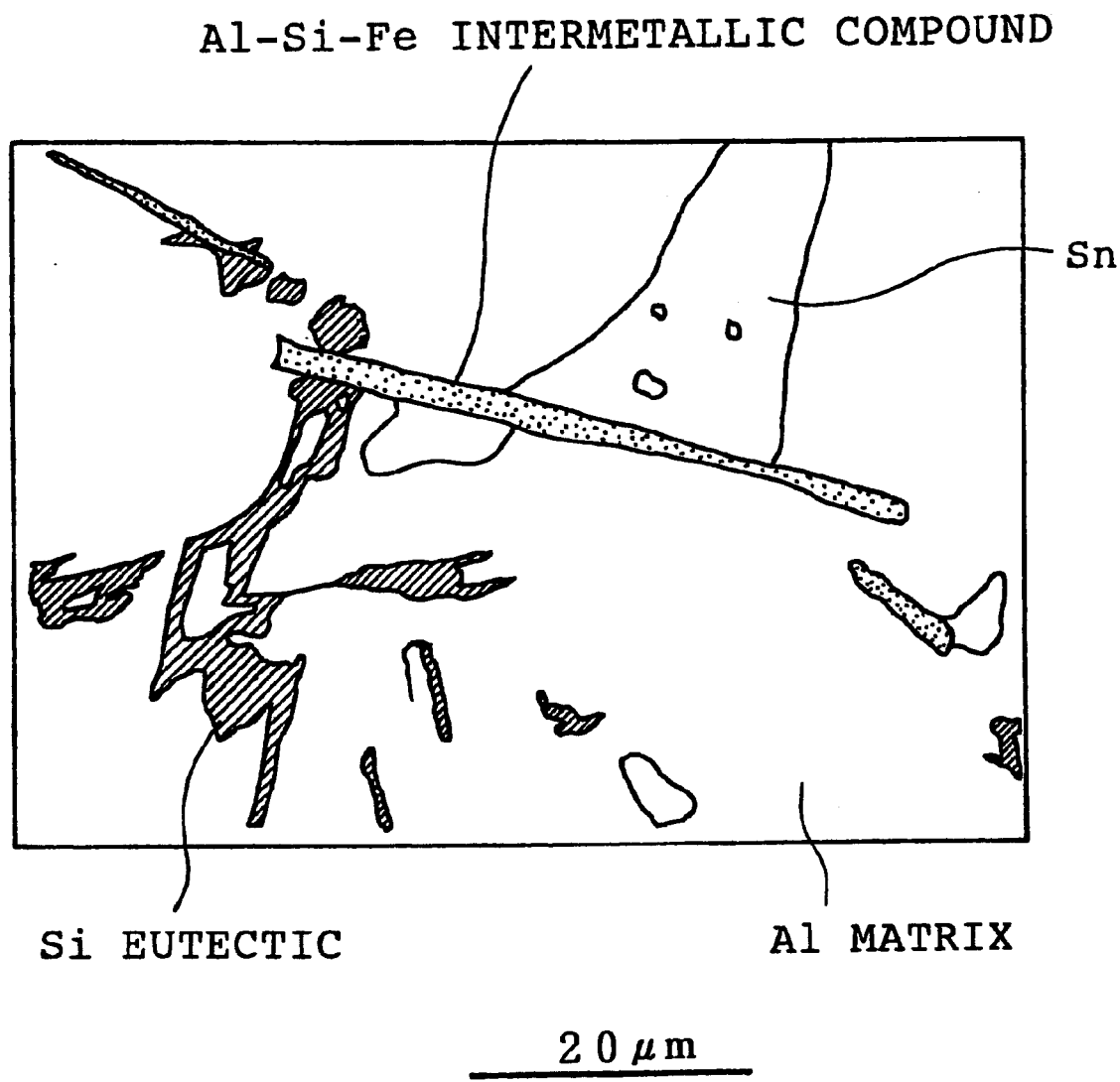
FIG. 3 is a microphotograph of a cast plate-shaped material crystallized an Al—SI—Fe ternary intermetallic compound.

The ternary intermetallic compound of Al—SI—Fe or the multi-element intermetallic compound of Al—SI—Fe-Mn etc.) is crystallized and the Si particles are crystallized in the continuously cast plate 21 as shown in FIG. 3. Further, the cooling rate of the cast plate 21 is controlled so as to range between 3 and 6° C./sec in the casting step, whereby the size of the crystallized intermetallic compound can be controlled so as to range between 30 and 70 $\mu$m and the size of the Si eutectic structure can be controlled so as to be at or below 40 $\mu$m.

Thereafter, the continuously cast plate 21 is continuously cold-rolled so that the thickness thereof is reduced from 15 mm to 6 mm. A thin aluminum plate for forming a bonding layer is then cladded on the cast plate 21 and subsequently with a backing steel plate so that a bimetal is made. The bimetal is then annealed so that the bonding strength is improved between the cast plate 21 and the backing steel plate. A solution treatment is carried out to strengthen the aluminum alloy. The bimetal is held at the temperature of 470° C. for 20 minutes in the solution treatment. After water cooling (quenching), an aging treatment is carried out in which the bimetal is held at the temperature of 170° C. for 15 hours.

Figure 4:
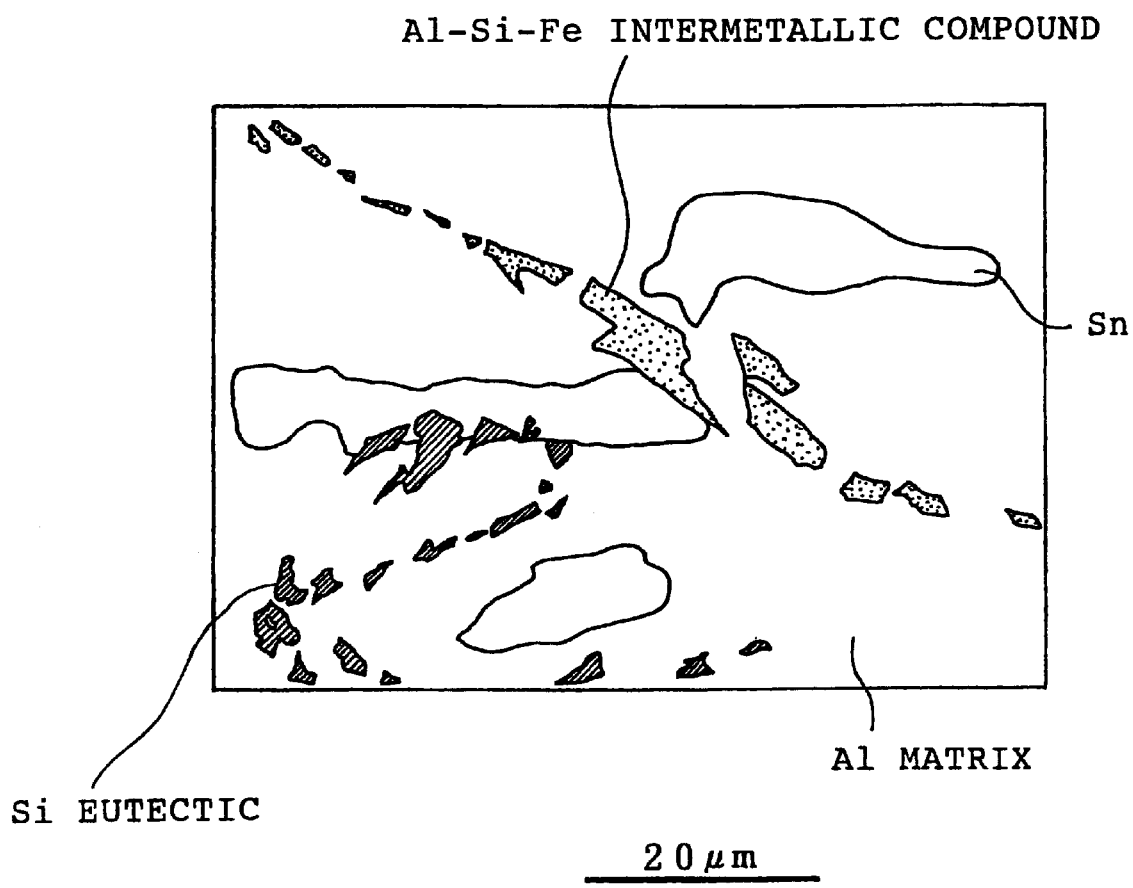
FIG. 4 is also a microphotographic of the rolled cast plate-shaped material containing the Al—SI—Fe ternary intermetallic compound.

The intermetallic compound is crushed as the result of execution of the aforesaid rolling, cladding, etc. such that its size is reduced from the initial one ranging between 40 and 55 μm to a range of 1 to 20 μm. As a result, the intermetallic compound is formed into an angular shape with sharp edges as shown in FIG. 4. Further, 6 to 200 hard particles consisting of the intermetallic compound are distributed per square millimeter. The size and distribution of the hard particles remain almost unchanged even after a subsequent heat treatment. On the other hand, the Si particles are also crushed by the rolling, cladding, etc. After the aging treatment, the Si particle finally has a rounded shape with its maximum diameter being less than 5 μm. 200 or more Si particles are distributed per square millimeter. Subsequently, the bimetal is machined into a semi-cylindrical bearing.

FIG. 5 shows alloy composition (mass %) in executed test casting, type of continuous casting machine used in the casting, and cooling rate. Symbol, "BC1," in the column of the casting machine refers to a continuous casting machine with water-spraying pipes in accordance with the present invention. Symbol, "BC2," refers to a conventional continuous casting machine without water-spraying pipes.

FIG. 6 shows the results of inspection of the structure and rolling workability of the cast plate regarding the alloys 1 to 6 (products of the present invention) and the alloys 11 to 16 (products of the prior art), and the results of tests for fatigue resistance, wear resistance and anti-seizure property regarding bearings made from the aforesaid alloys. TABLES 1 to 3 show the conditions under which the fatigue, wear and seizure tests were carried out, respectively.

TABLE 1

Test conditions
Fatigue test

| | |
|---|---|
| Testing machine | Fatigue testing machine |
| Revolution | 3250 rpm |
| Circumferential speed | 9.0 m/sec |
| Test time | 20 hours |
| Oil inlet temperature | 100° C. |
| Oil supply pressure | 0.49 MPa |
| Lubricant oil | VG68 |
| Shaft material | JIS-S55C |
| Evaluation method | Maximum specific load without fatigue occurrence |

TABLE 2

Test conditions
Wear test

| | |
|---|---|
| Revolution | 1000 rpm |
| Circumferential speed | 1.0 m/sec |
| Test load | 10 MPa |
| Test time | 10 hours |
| | Run: 60 sec Stop: 30 sec |
| Oil flow | 2 ml/min |
| Lubricant oil | VG22 |
| Shaft material | JIS-S55C |

TABLE 3

Test Conditions
Seizure test

| | |
|---|---|
| Revolution | 7200 rpm |
| Circumferential speed | 20 m/sec |
| Test load | Increased 10 MPa every 10 minutes |
| Oil inlet temperature | 100° C. |
| Oil flow | 150 ml/min |
| Lubricant oil | VG22 |
| Shaft material | JIS-S55C |
| Evaluation method | Seizure occurrence is judged when the Temperature of back face of the Bearing exceeds 200° C. or when torque Variations cause a shaft driving Belt to slip |

The structure inspection and test results shown in FIG. 6 will first be analyzed. Mark, "O" in the column of structure shows that no segregation has occurred and further that the crystallized intermetallic compound ranges in the size between 40 and 55 μm and is uniformly distributed. Mark, "x" shows that segregation has occurred. The segregation in FIG. 6 refers to a state where the crystallized grain in the structure of the cast plate differs from one to another, where distribution of Sn or Si is non-uniform, or where a coarse Al—SI—Fe intermetallic compound is present. Regarding rolling workability, evaluation was made on the basis of the depth of crack in a widthwise end of the cast plate when the thickness was reduced by 50% in the rolling step. Mark, "O" shows that the depth of crack is not more than 5 mm. Mark, "x" shows that the depth of crack exceeds 5 mm.

As obvious from FIG. 6, the structure has no segregation in each of the invention products which is rapidly cooled at the cooling rate ranging between 3 and 6° C. However, the structure has segregation in each prior art product which is slowly cooled when the cooling rate is at or below 3° C./sec. consequently, each invention product has a slight crack during rolling and a good rolling workability although each prior art product has a large crack and a poor rolling workability. Accordingly, an amount of thickness reduction per roll pass is rendered larger in each invention product, whereupon the productivity can be improved. Furthermore, it can be understood that the invention products are also better than the prior art products in the fatigue resistance, wear resistance and anti-seizure property.

As described above, the molten aluminum alloy is cooled at the cooling rate of 3 to 6° C./sec so that the cast plate 21 is cast. The intermetallic compound and Si particles crystallized in the cast plate 21 are controlled to have respective suitable sizes so as not to be coarsened. As a result, occurrence of crack can be prevented in the cast plate 21 in the subsequent rolling, and the intermetallic compound and the Si are crushed due to the rolling. As a result, the intermetallic compound is sized so that the anti-seizure property and wear resistance can be improved by the effect of the aforesaid lapping etc. Further, the Si particles are broadly distributed on the Al matrix and sized so that the fatigue strength can be improved.

The present invention should not be limited to the aluminum bearing alloy crystallizing the Al—SI—Fe intermetallic compound or the multi-element intermetallic compound consisting of Mn etc. in addition to Al, Si and Fe. The invention may be applied to a casting method and apparatus for conventional aluminum bearing alloy.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A method of continuous casting of a molten aluminum bearing alloy in which a casting space is defined between substantially parallel opposed portions of a pair of traveling endless belts and the molten aluminum bearing alloy is supplied into the casting space to be continuously cast into the shape of a plate, the method comprising:

air-spraying the plate as it emerges from the casting space;

water-spraying said plate downstream from said air-spraying;

preventing water from contacting said plate after it has emerged from the casting space upstream from said air-spraying, by preventing splashing of water from the downstream water-spraying; and controlling said water-spraying to provide a cooling rate $\Delta T$ during solidification of the aluminum bearing alloy so that the cooling rate $\Delta T$ ranges between 3 and 6° C./sec. where $\Delta T=(T-500)/t$, T is a temperature when the casting of the aluminum bearing alloy starts, and t is a time in sec. between start of casting and the cooling time when the temperature of the aluminum bearing alloy decreases to 500° C., thereby providing a cooled plate containing a multi-element inter-metallic compound of at least Al—SI—Fe having a particle size of 40–55 μm.

2. The method according to claim 1, wherein the aluminum bearing alloy comprises, by mass, 3 to 40% Sn, 0.5 to 7% Si, 0.05 to 2% Fe and balance of Al and unavoidable impurities, and a ternary intermetallic compound of Al—SI—Fe is crystallized.

3. The method according to claim 1, wherein the aluminum bearing alloy comprises, by mass, 3 to 40% Sn, 0.5 to 7% Si, 0.05 to 2% Fe, at least one or more of 0.01 to 3% each of Mn, V, Mo, Cr, Co, Ni and W, and balance of Al and unavoidable impurities and a multi-element intermetallic compound of Al—SI—Fe containing said at least one or more of Mn, V, Mo, Cr, Co, Ni, W, and the balance of Al is crystallized.

4. The method according to claim 1, wherein the aluminum bearing alloy comprises, by mass, at least one or more of 0.01 to 2% each of B, Ti and Zr.

5. The method according to claim 2, wherein the aluminum bearing alloy comprises, by mass, at least one or more of 0.1 to 5% each of Cu, Mg and Zn.

6. The method according to claim 3, wherein the aluminum bearing alloy comprises, by mass, at least one or more of 0.1 to 5% each of Cu, Mg and Zn.

7. The method according to claim 4, wherein the aluminum bearing alloy comprises, by mass, at least one or more of 0.1 to 5% each of Cu, Mg and Zn.

* * * * *